United States Patent [19]
Philipp et al.

[11] Patent Number: 6,054,783
[45] Date of Patent: Apr. 25, 2000

[54] SYNCHRONOUS LINEAR ELECTRIC MOTOR AND METHOD FOR DETERMINING THE COMMUTATION OFFSET OF A LINEAR DRIVE WITH SUCH A SYNCHRONOUS LINEAR ELECTRIC MOTOR

[75] Inventors: Werner Philipp; Eberhard Schemm; Bernd Schnurr, all of Lohr/Main, Germany

[73] Assignee: Rexroth Indramat GmbH, Lohr/Main, Germany

[21] Appl. No.: 09/091,083

[22] PCT Filed: Dec. 4, 1996

[86] PCT No.: PCT/EP96/05396

§ 371 Date: Jun. 10, 1998

§ 102(e) Date: Jun. 10, 1998

[87] PCT Pub. No.: WO97/23028

PCT Pub. Date: Jun. 26, 1997

[30]     Foreign Application Priority Data

Dec. 20, 1995  [DE]  Germany ................ 195 47 686

[51] Int. Cl.[7] .................................................. H02K 41/00
[52] U.S. Cl. .................................................. 310/12
[58] Field of Search .................................. 310/12, 13, 14

[56]             References Cited

U.S. PATENT DOCUMENTS

| 5,289,088 | 2/1994 | Toshiyuki | 318/135 |
| 5,359,245 | 10/1994 | Seiji | 310/12 |
| 5,461,311 | 10/1995 | Masakazu | 324/207.24 |
| 5,536,983 | 7/1996 | Hirokazu | 310/12 |
| 5,757,091 | 5/1998 | Sogabe et al. | 310/12 |

FOREIGN PATENT DOCUMENTS

| 2128996 | 12/1971 | Germany . |
| 3303961 | 8/1983 | Germany . |

OTHER PUBLICATIONS

Pollerageerfassungssystem beim synchronen Langstatormotor mit Eisenkreis. In: ETR, 29, No. 7, 8, 1980, p. 588–590, 1989 Hestra–Verlag Darmstadt (month unknown).

Patent Abstracts of Japan, vol. 012, No. 254 (E–634), Jul. 16, 1988 & JP 63 039454 A (Hitachi Kiden Kogyo Ltd), Feb. 19, 1988 (see abstract).

Patent Abstracts of Japan vol. 010, No. 095 (E–395) Apr. 12, 1986 & JP 60 237855 A (Nippon Denki KK) Nov. 26, 1985, see abstract.

Machine Design International, 12, Sep. 1994, USA, vol. 66, No. 17, ISSN 0024–9114, pp. 60–64, XP000468049 Lammers M G M: "Linears lead in ultrasmooth motion (linear servomotors)".

SU 1 486 794 A (Inst Nadezhnosti Dolgovechnost) Jun. 15, 1989.

*Primary Examiner*—Nestor Ramirez
*Assistant Examiner*—Judson H. Jones
*Attorney, Agent, or Firm*—Martin A. Farber

[57]                ABSTRACT

A synchronous linear electric motor with a secondary part that contains several permanent magnets arranged in a certain pole grid, and with a primary part that can move relative to the secondary part and whose position relative to the secondary part can be determined by a travel measurement system. For a simple determination of a commutation offset during startup of the linear motor, a mechanical marking is provided on the secondary part that has a known relationship to the pole grid of the permanent magnets. There is also a method for detecting the commutation.

19 Claims, 3 Drawing Sheets

SYNCHRONOUS LINEAR ELECTRIC MOTOR AND METHOD FOR DETERMINING THE COMMUTATION OFFSET OF A LINEAR DRIVE WITH SUCH A SYNCHRONOUS LINEAR ELECTRIC MOTOR

FIELD AND BACKGROUND OF THE INVENTION

The invention relates initially to a synchronous linear electric motor with a secondary part containing several permanent magnets arranged in a certain pole grid, and with a primary part that can move relative to the secondary part and whose position relative to the secondary part can be determined by a travel measurement system.

The invention also relates to a method for determining the commutation offset in a synchronous linear electric motor.

In order to ensure a force of the synchronous linear motor that is constant over time, an angle of 90° must be set between the field vector of the primary part and the field vector of the secondary part. This means that the motor control of the primary part must operate as a function of the current position of the location of the permanent magnet poles of the secondary part. Therefore, the motor control requires the current actual position values of the primary part relative to the secondary part. A travel measurement system is provided for the purpose, which supplies this information for motor control.

In synchronous motors in general, following mechanical assembly, there is initially no unambiguous relationship between the field vectors of the primary and secondary parts. This relationship is clearly established during the initial startup of the drive by determining the so-called commutation offset.

SUMMARY OF THE INVENTION

It is an object of the invention to design a synchronous linear electric motor in such fashion that it can be put in operation in simple fashion with economical manufacture and reliable function. In addition, a high degree of safety must also be ensured during assembly. A simple method must also be specified for startup.

A simple startup is possible with a synchronous linear electric motor in accordance with the invention. In such a synchronous linear electric motor, a mechanical marking is provided on the secondary part with a known relationship to the pole grid of the permanent magnets. Such a marking can be used to determine the position of the primary part relative to the permanent magnets of the secondary part, and hence the commutation offset. After a relationship has been established between the commutation offset and the position of the primary part at the moment as determined by the travel measurement system, the motor control can control the windings of the primary part such that an angle of 90° is set between the field vectors of the primary and secondary parts.

A method according to the invention is especially favorable for determining commutation offset, according to which claim the commutation offset is calculated from the distance determined between the mechanical marking on the secondary part and the primary part as well as the position of the marking to the pole grid internally in the motor control device.

Preferably, according to a feature of the invention, the relationship of the mechanical marking to the pole grid of the permanent magnets is stored in a nonvolatile manner in an electrical motor control device.

Advantageously, an absolute travel measurement system is used as the travel measurement system. The commutation offset then does not have to be determined again after each time the motor control device is switched off, but only when changes are made in the travel measurement system or when mechanical reconstruction with modified mounting conditions of the primary or secondary parts has been performed.

Mounting bores are usually provided on the secondary part of the synchronous linear electric motor, said bores serving to fasten the secondary part to the machine bed. It is favorable to use a mounting bore of the secondary part directly or indirectly as a mechanical marking.

Several mechanical markings with the same position relative to the pole grid of the permanent magnets of the secondary part can also be provided. The term "same position relative to the pole grid" means that the mechanical markings are located exactly in the middle of a north pole of the secondary part for example. The advantage of several markings is that smaller distances have to be measured so that it may be possible to avoid shifting the primary part. Basically, however, it makes no difference which marking is used to determine the commutation offset. In exactly the same way as when only one marking is present, a determination is initially made, by external calculation or automatically in the control device, as to how many whole-number multiples of the step width of the pole grid, i.e. the distance between two like poles of the secondary part, are contained in the measured distance. The remainder is critical for determining the commutation offset.

The secondary part of a synchronous linear electric motor is usually composed of several secondary individual parts with which travel lengths of different sizes can be achieved depending on the number and length of the individual secondary parts. According to another feature of the invention, each of the individual secondary parts is advantageously provided with a mechanical marking with the same position relative to the pole grid.

If the secondary part has a row of mounting bores that runs in the lengthwise direction, with all of the bores having the same position relative to the pole grid, all of these mounting bores can be used as a mechanical marking. Preferably, the distance between the mounting bores corresponds to the step width of the pole grid. The mounting bores of a second row that runs in the lengthwise direction of the secondary part advantageously have different distances from one another. Therefore, the two rows can clearly be distinguished from one another, thus facilitating the assembly of the secondary part from several individual secondary parts. If all of the mounting bores in a row do not have the same distance from one another, the assembly is not correct. The ability to distinguish between the two rows of mounting bores also facilitates the correct arrangement of the primary part relative to the secondary part. As an orientation aid on the primary part, its cable outlet is advantageously mounted laterally.

Because of the difference in height between the secondary part and the primary part, under certain conditions it is not as favorable for the mechanical marking on the secondary part to be used to measure the spacing. It may be better, to use a reference device that can be located on the secondary part with a known relationship to the pole grid of the permanent magnets, with device having a marking whose distance from the primary part can be determined. Advantageously, an edge that runs perpendicular to the lengthwise direction of the secondary part on one lateral surface of the reference device can be used as the marking.

All of the available secondary parts are constructed identically to one another as far as the pole arrangement is concerned. The individual lengths of the individual secondary parts can be different. An important feature is that each north pole is followed by a south pole and vice versa in the lengthwise direction of the secondary parts.

BRIEF DESCRIPTION OF THE DRAWINGS

With the above and other objects and advantages in view, the present invention will become more clearly understood in connection with the detailed description of a preferred embodiment, when considered with the accompanying drawings of which.

DETAILED DESCRIPTION OF THE PREFERRED EMBODIMENT

Figure 1:
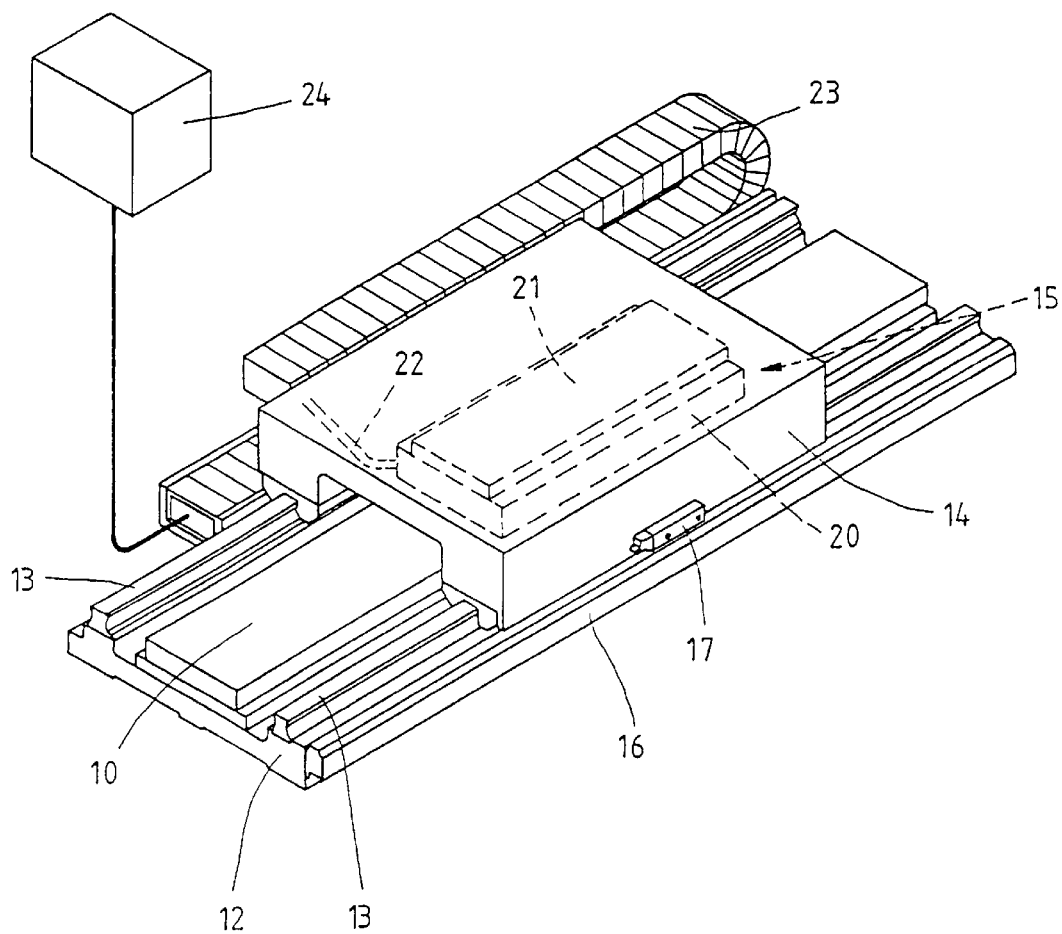
FIG. 1 is a perspective view of an embodiment of a synchronous linear electric motor according to the invention.
Figure 2:
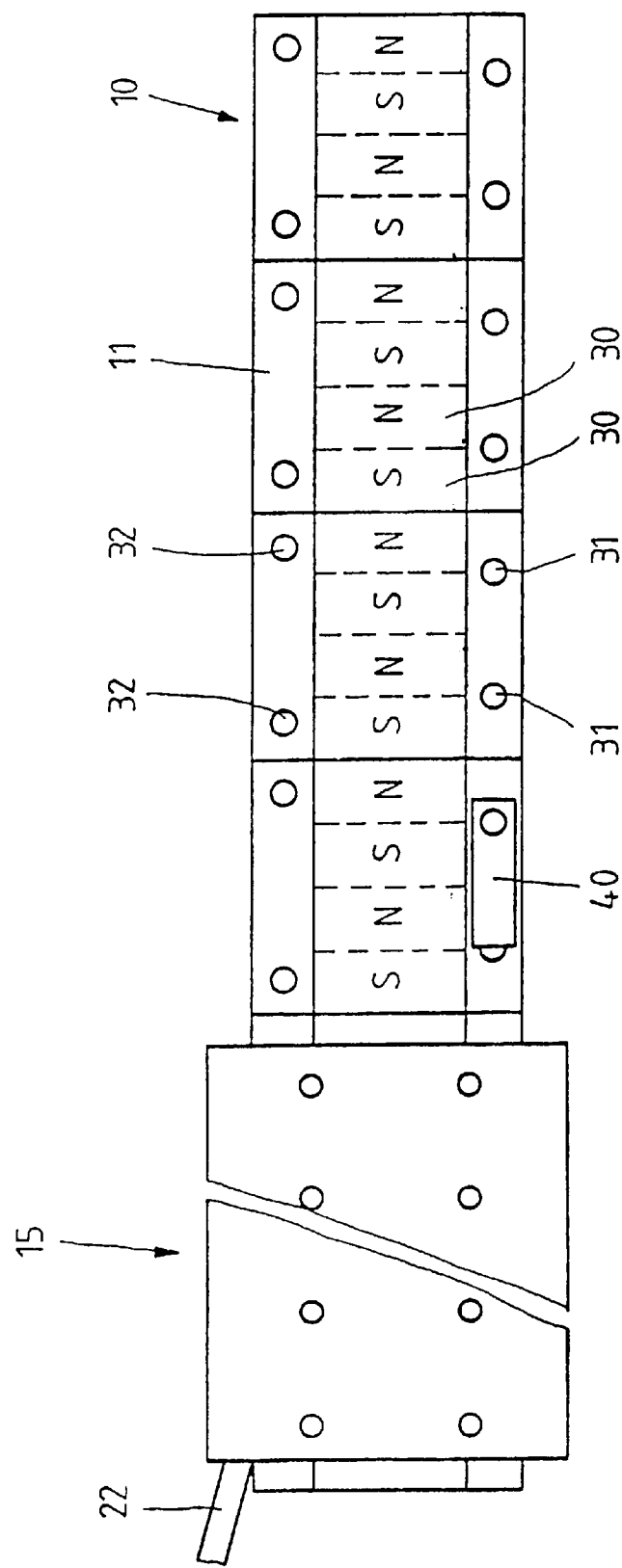
FIG. 2 is a top view of the embodiment, with the mechanical reference device mounted on the secondary part.

The arrangement of the synchronous linear electric motor in a machine can be seen from FIG. 1. Secondary part 10, which is composed of several secondary individual parts 11 identical to one another as shown in FIG. 2, is mounted on a machine bed 12 between two guide rails 13. A bridge-shaped machine carriage 14 is guided on these rails, said carriage supporting the primary part 15 at its underside that faces the secondary part 10 of the linear motor. An absolute measuring rod 16 of an absolute travel measurement system is mounted on the machine bed and extends in the lengthwise direction of guide rails 13 and of secondary part 10 of the linear motor. The corresponding travel recorder 17 is mounted on machine carriage 14. The principle of the travel recorder also applies in the reverse arrangement, i.e. the scale rod moves and the scanning head is permanently attached to the part that remains at rest.

Primary part 15 comprises a block 20 in which electrical coils and lines are accommodated in a manner not shown in greater detail. A cooling plate 21 is mounted on the block. Cable 22 emerges laterally from an end face of the primary part 15 that points in the direction of the lengthwise extent of the linear motor and passes through a flexible cable channel 23 to a motor control device 24.

All of the available secondary individual parts 11 are constructed identically to one another relative to the magnetic pole arrangement and each has permanent magnets 30. In the lengthwise direction of the secondary part, a north pole always follows a south pole continuously and vice versa. The step width of the pole grid, i.e. the distance between two like poles, is equal to half the length of a secondary individual part 11. On both sides of permanent magnet 30, each secondary individual part 11 has two mounting bores 31 and 32, located in a carrier 33 for the permanent magnets 30. The distance between the two mounting bores 31 on one side corresponds to the step width of the pole grid. In addition, each of the two mounting bores 31 is located at a distance from the adjacent end of the secondary individual part that is equal to half the step width of the pole grid. Thus, when the secondary individual parts 11 are assembled so that all of the mounting bores 31 are on the same side, a row of mounting bores is obtained, all of which are located the same distance from one another. In addition, the relative positions of all the mounting bores 31 are the same relative to the pole grid. Each mounting bore 31, as viewed in the lengthwise direction of the secondary part 10, is located precisely between a south pole and a north pole located on the same side of the south pole in each case.

Mounting bores 32 on the other side of a secondary individual part 11 are also each located at the same distance from the adjacent face. This distance however is smaller than half the step width of a pole grid, so that the distance between two mounting bores 32 of a secondary individual part 11 is greater than the step width of the pole grid. Therefore, on one side of secondary part 10 there is a row of mounting bores in which the distance between two mounting bores is alternately larger or smaller. The different arrangement of the mounting bores on the two sides of a secondary individual part 11 thus facilitates the correct assembly of the secondary individual parts 11 to form a long secondary part. On one side, there must be a row of mounting bores in which two successive mounting bores are located the same distance from one another. On the other side, the spaces between successive mounting bores are alternately larger or smaller.

Primary part 15 is located relative to secondary part 10 in such fashion that cable 22 emerges on the side of mounting bores 32.

Figure 3:
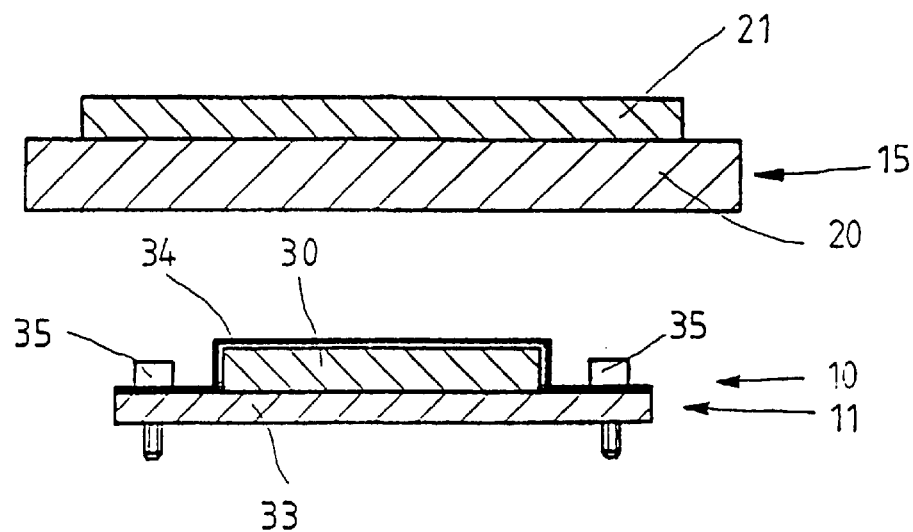
FIG. 3 is a cross section through the primary and secondary parts, with the distance between the two parts being enlarged.
Figure 5:
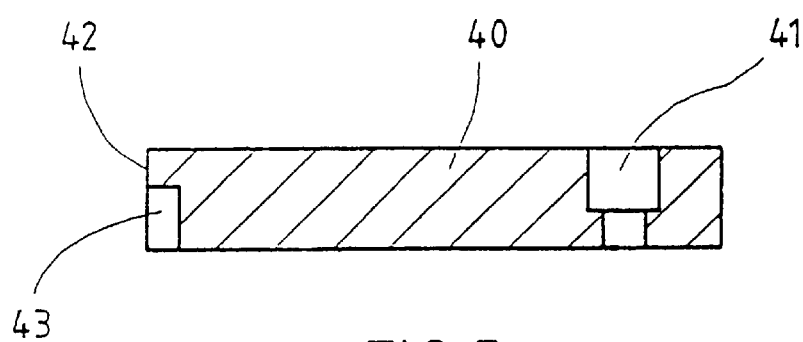
FIG. 5 is a section along line V—V in FIG. 4.
Figure 4:
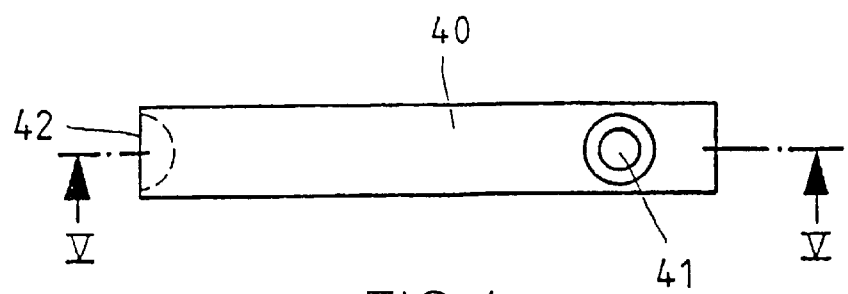
FIG. 4 shows in an enlarged scale, a top view of the mechanical reference device itself in FIG. 2.

The permanent magnets 30 are covered by a cover panel 34 that can be seen in FIG. 3 and which is secured to carrier 33 by the same bolts 35 that are passed through mounting bores 31 and 32 and secure secondary individual parts 11 to the machine bed 12.

Each of the mounting bores 31 can be used as a mechanical marking with whose aid the commutation offset of the primary part relative to the secondary part can be determined during startup of the linear motor. For this purpose, the distance between the axis of a mounting bore 31 and the end of the primary part 15 that has no cable outlet can be determined. This can be accomplished with the aid of a scale rod without further means. Even if measurement accuracy that is not very high is required for the interval measurement, because of the difference in height between a mounting bore 31 and the primary part 15, it may be difficult to determine the spacing sufficiently accurately. Therefore, a reference device 40 is advantageously employed that can be secured in a fixed position relative to bores 31 on the secondary part 10. Reference device 40 is an elongate profile made of aluminum for example, that has a through stepped bore 41. This bore is aligned with a mounting bore 31 for securing reference device 40 to secondary part 10, with no mounting bolt 35 in bore 31 or with mounting bolt 35 having been unscrewed. Then a bolt 35 is passed through stepped bore 41 and mounting bore 31 and is screwed into a threaded bore in the machine bed. Reference device 40 extends up to the axis of an adjacent mounting bore 31 that is located in an end 42 of the reference device 40 that extends perpendicularly to the lengthwise direction of secondary part 10. The head of a bolt 35 located in the adjacent mounting bore can be received In a recess 43 at end 42. The distance between end 42 and primary part 10 corresponds to the distance from the corresponding mounting bore 31. In order to determine the commutation offset when the synchronous linear motor is started, the distance between end 42 of the reference device 40 and the facing end of the primary part 15 is measured. During measurement, the primary part must reliably maintain its position relative to the secondary part until the next input of the measured values. The measured distance is entered into the motor control device, which calculates the commutation offset from the stored position of the mounting bores 31 relative to the permanent magnets 30. Only a remaining distance is taken into account in the course of this process that is obtained if the step width of the pole grid is subtracted as often as possible in advance. In addition to secondary part 10, the position of primary part 15 relative to the travel measurement system is also taken into account. The motor control now knows how primary part 15 is to be controlled when it is in a certain position as detected by the travel measurement system.

We claim:

1. Synchronous linear electric motor with a secondary part (10) that has several permanent magnets (30) arranged in a certain pole grid, and with a primary part (15) that is movable relative to the secondary part (10), and wherein the position of the primary part relative to the secondary part (10) is detectable by a travel measurement system (16, 17), and a mechanical marking (31) is located on the secondary part (10) with a known relationship to the pole grid of the permanent magnet, the pole grid serving as a part of a travel measurement system;

wherein, during operation of the motor, the mechanical marking serves to determine the relative initial position of the primary part with respect to the pole grid; and after associating the initial position of the primary part relative to the pole grid, the mechanical marking enables an electric motor control unit to drive the primary part as a function of a displacement detected by the travel measurement system.

2. Synchronous linear electric motor according to claim 1, further comprising said electrical motor control device (24) in which the relationship of a mechanical marking (31) to the pole grid of the permanent magnets (30) is stored in a nonvolatile manner.

3. Synchronous linear electric motor according to claim 1, comprising said absolute travel measurement system (16, 17) for detecting the position of the primary part (15) relative to the secondary part (10).

4. Synchronous linear electric motor according to claim 1, wherein a mounting bore (31) in the secondary part (10) serves directly or indirectly as the mechanical marking.

5. Synchronous linear electric motor according to claim 1, wherein several mechanical markings (31) in addition to said mechanical marking are provided that have the same positions relative to the pole grid of the permanent magnets (30) of the secondary part (10).

6. Synchronous linear electric motor according to claim 1, wherein the secondary part (10) is composed of several preferably identical secondary individual parts (11) each of which has a mechanical marking (31) with the same position relative to the pole grid of the permanent magnets (30).

7. Synchronous linear electric motor according to claim 4, comprising a row of mounting bores (31) on the secondary part (10) that extend in lengthwise direction of the secondary part (10), said bores all having the same position relative to the pole grid.

8. Synchronous linear electric motor according to claim 7, further comprising a second row of mounting bores (32) running in the lengthwise direction of the secondary part (10), said bores (32) being spaced at different distances from one another.

9. Synchronous linear electric motor according to claim 8, further comprising a lateral outlet for a cable (22) on the primary part.

10. Synchronous linear electric motor according to claim 1, further comprising a mechanical reference device (40) locatable in a known relationship to the pole grid of the permanent magnets (30), said device having a marking (42) whose distance from the primary part (15) can be determined.

11. Synchronous linear electric motor according to claim 10, wherein an edge of a lateral surface (42) of the reference device (40) that extends perpendicularly to the lengthwise direction of the secondary part (10) serves a marking.

12. Synchronous linear electric motor according to claim 10, wherein the reference device (40) can be placed in a fixed relationship to the mounting bores (31) of the secondary part (10) by using at least one mounting bore (31) of the secondary part (10).

13. Method for determining the commutation offset in a linear drive with a synchronous linear electric motor with features of claim 2, comprising the steps of determining the distance between the mechanical marking (31) placed on the secondary part (10) and a predefined point on the primary part (15), entering or automatically reading the distance thus determined into a motor control device (24), and calculating the commutation offset in the motor control device (24) from the position of the marking (31) relative to the pole grid and the distance of the marking (31) from the predefined point on the primary part (15).

14. Synchronous linear electric motor according to claim 2, comprising said absolute travel measurement system (16, 17) for detecting the position of the primary part (15) relative to the secondary part (10).

15. Synchronous linear electric motor according to claim 4, wherein several mechanical markings (31) in addition to said mechanical marking are provided that have the same positions relative to the pole grid of the permanent magnets (30) of the secondary part (10).

16. Synchronous linear electric motor according to claim 7, the spacing of the mounting bores from one another corresponds to the step width of the pole grid.

17. Synchronous linear electric motor according to claim 16, further comprising a second row of mounting bores (32) running in the lengthwise direction of the secondary part (10), said bores (32) being spaced at different distances from one another.

18. Synchronous linear electric motor according to claim 17, further comprising a lateral outlet for a cable (22) on the primary part.

19. Synchronous linear electric motor according to claim 11, wherein the reference device (40) can be placed in a fixed relationship to the mounting bores (31) of the secondary part (10) by using at least one mounting bore (31) of the secondary part (10).

* * * * *